Nov. 23, 1937. G. THIELER, JR 2,100,041
HOLDER FOR BRAKE INSPECTION TAGS
Filed June 6, 1936
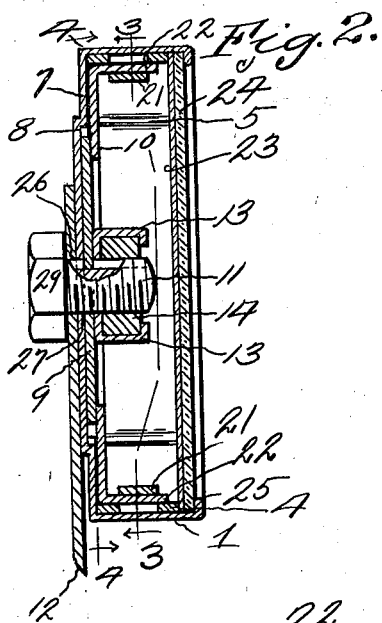
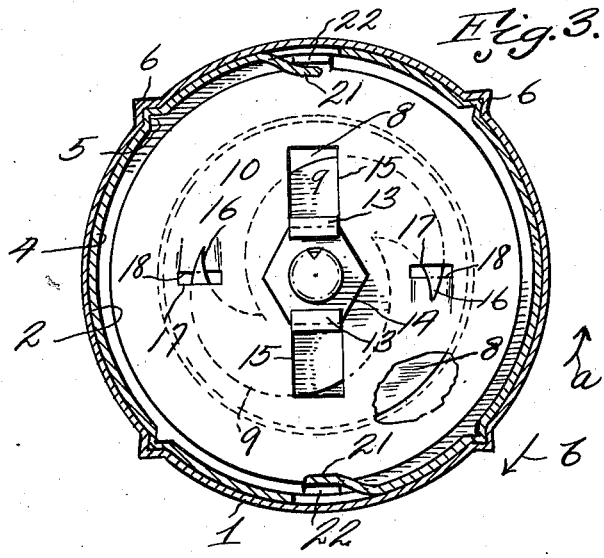
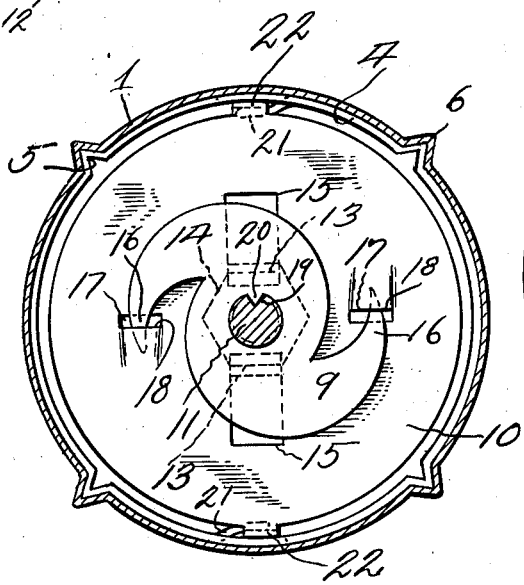
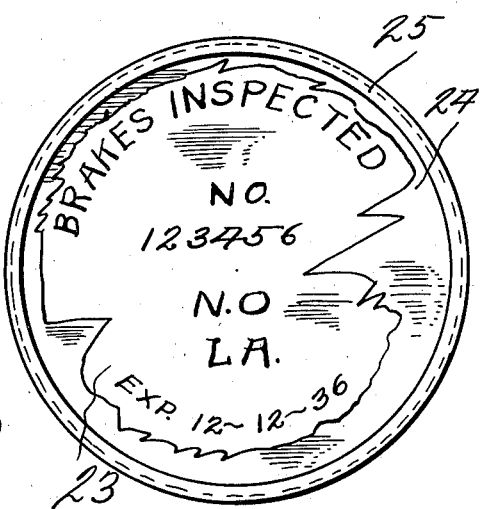
Inventor
George Thieler Jr.
By Philip A. H. Sorrell
Attorney Patented Nov. 23, 1937

2,100,041

UNITED STATES PATENT OFFICE 2,100,041

HOLDER FOR BRAKE INSPECTION TAGS

George Thieler, Jr., New Orleans, La.

Application June 6, 1936, Serial No. 83,982

5 Claims. (Cl. 40—2.2)

The invention relates to holders for brake inspection tags of the type issued by various States and municipalities which require that the brakes be inspected at predetermined periods for safety purposes, and has for its object to provide a holder in the form of a container attached to the vehicle in a manner whereby it can not be removed by an unauthorized person, or access be had to the interior of the holder.

A further object is to provide a brake inspection tag holder comprising a receptacle for the reception of the tag, a nut within the receptacle and adapted to receive a bolt passing through a support, said nut being carried by a plate within the receptacle and a plate carried by the bolt and rotatable therewith and having spring arms in the path of the nut carrying plate and adapted to receive and pass through apertures in the nut carrying plate upon retrograde rotation of the bolt.

A further object is to provide the nut carrying plate with arms in the path of lugs carried by the receptacle casing for preventing rotation of the nut carrying disc when the bolt is screwed into the casing during a vehicle attaching operation.

A further object is to provide a ring within the casing and carrying the stop lugs for the nut carrying disc and holding the brake tag and transparent member against the turned edge of the receptacle.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a view in elevation of the holder, showing parts of the transparent member broken away to beter illustrate the structure.

Figure 2 is a vertical longitudinal sectional view through the holder.

Figure 3 is a vertical transverse sectional view through the holder, taken on line 3—3 of Figure 2.

Figure 4 is a vertical transverse sectional view through the holder taken on line 4—4 of Figure 2.

Figure 5 is a perspective view of the prong carrying disc.

Referring to the drawing the numeral 1 designates a round casing of the tag holder, which casing is provided with a chamber 2. Disposed within the chamber 2 of the casing is an annular lug carrying member 4, which is preferably provided with struck out lugs 5 which are received within the channels 6, struck outwardly from the casing for preventing rotation of the annular member 4 within the casing. The rear side 7 of the casing 1 is provided with a depression 8, in which is rotatably mounted the prong carrying disc 9, which cooperates with the nut carrying disc 10 for preventing retrograde rotation of the bolt shank 11 for removing the device from the support 12 after it has once been placed in position. The nut carrying disc 10 is provided with struck-out tongues 13, which engage opposite sides of the nut 14 and overlie the outer face thereof, not only for holding the nut but for preventing axial displacement of the nut during the tightening of the bolt. It will be noted that the tongues 13 are struck outwardly from the disc 10, thereby forming recesses 15 in the disc, which are in the path of the spring arms 16 carried by the disc 9, therefore it will be seen that the discs 9 and 10 will be held against left hand movement in relation to each other when it is attempted to unscrew the bolt shank 11. Disc 10 is also provided with struck out recesses or apertures 17 in the path of the spring arms 16 which perform the same functions as performed by the recesses 15. Referring to Figure 4, it will be noted that the edges 18 of the apertures 17 are slightly off-set from the disc so that the spring arms 16 will enter the apertures upon an attempt to unscrew the bolt shank 11 on a left hand rotation. The bolt shank 11 is provided with a longitudinally disposed slot 19 for the reception of the lug 20 carried by the disc 9, hence it will be seen the disc 9 will rotate with the bolt shank 11.

The annular member 4 is provided with inwardly off-set fingers 21 which form stops for the arms 22 carried by the disc 10 and hold the disc against rotation and the nut 14 stationary when the bolt shank 10 is screwed into the nut 14. It is to be understood that all of the receptacle mechanism is assembled as a whole, and the inspection card 23, under its transparent member 24, is assembled in the device before the final edge turning operation at 25.

The device or receptacle with the parts therein in assembled relation are placed against the support 12, which may be the license plate, and after which the bolt shank 11 is passed through the support aperture 26, the aperture 27 in the rear wall of the casing and thence through the aperture 28 in the spring detent carrying disc 9. It will be noted that in inserting the shank 11, the lug 20 of the disc 9 is received within the slot 19 of the bolt shank. As the operator turns the bolt head 29 for tightening the bolt, the nut 14 is held by the struck out members 13 against rotation. As the bolt is rotated to the right for a tightening operation, the prong carrying disc 9 carried thereby rotates in the direction of the arrow *a*, Figure 3, and the disc 10 will have a retrograde motion until its arms 22 engage the stop lugs 21 carried by the disc 10; this will stop the rotation of disc 10 as the annular member 4 is held against rotation at 5 and 6. The above operation continues until the bolt is tightened and the device securely attached to the support 12.

If an unauthorized person should try to unscrew the bolt the disc 9 would be rotated in the direction of the arrow *b*, Figure 3, and the bent spring arm 16 will enter either the slots 17 or the apertures 15 and positively lock the discs 9 and 10 together, so that they will rotate together in the direction of the arrow *b*.

As the discs 9 and 10 continue to rotate in the direction of the arrow *b*, Figure 3, upon a left hand rotation of the bolt, the lugs 22 will spring over arms 21, thereby preventing the twisting off of parts, but through the medium of the lug connection 20 to the bolt shank 11, unscrewing of the shank from the nut 14 is positively prevented.

From the above it will be seen that a tag holder is provided in which a tag may be placed and the holder is constructed in a manner, whereby after it is once placed in a position on a support, it can only be removed by the destruction of the device, hence the device could not be removed from one car and placed on another, nor can the tag be changed or otherwise tampered with.

The invention having been set forth what is claimed as new and useful is:

1. A housing and locking device comprising a casing, a securing bolt extending into said casing, a nut carrying plate carried by the bolt within the casing and through which the bolt extends, a nut threaded on the bolt and anchored to the nut carrying plate, a spring arm detent disc within the casing on the bolt and rotatable therewith and spring arms carried by the detent disc and in the path of apertures in the nut carrying plate and adapted to interengage in said apertures when the bolt is rotated to an unscrewed position.

2. A device as set forth in claim 1 wherein an annular member is disposed within the casing, lugs carried by the annular member, lugs carried by the nut carrying plate in the path of the annular member and forming means whereby when the bolt is tightened in the nut the nut carrying plate will be held against rotation and allowed to rotate only upon an unscrewing operation of the bolt.

3. A device as set forth in claim 1 including interengaged stop lugs within the casing and carried by the nut carrying plate and casing for holding the nut carrying plate against rotation when the bolt is screwed in the nut.

4. A device as set forth in claim 1 including struck out nut holding lugs carried by the nut carrying plate and gripping opposite sides of the nut.

5. A device as set forth in claim 1 including an annular member within the casing, interengaging means between the annular member and casing for fixedly holding them together and cooperating lugs carried by the annular member and rotatable plate for preventing rotation of the nut carrying plate when the bolt is being screwed in the nut and allowing rotation of the nut carrying plate with the bolt and spring arm detent disc when the bolt is rotated to unscrewed position.

GEORGE THIELER, Jr.